June 10, 1924.  
W. E. BEE  
REDUCTION GEARING  
Filed Oct. 2, 1922  
1,496,867

Inventor  
WILLIAM E. BEE

Patented June 10, 1924.

1,496,867

UNITED STATES PATENT OFFICE.

WILLIAM E. BEE, OF DETROIT, MICHIGAN, ASSIGNOR TO PALMER-BEE COMPANY, OF DETROIT, MICHIGAN, A CORPORATION OF MICHIGAN.

REDUCTION GEARING.

Application filed October 2, 1922. Serial No. 591,931.

*To all whom it may concern:*

Be it known that I, WILLIAM E. BEE, a citizen of the United States of America, residing at Detroit, in the county of Wayne and State of Michigan, have invented certain new and useful Improvements in Reduction Gearing, of which the following is a specification, reference being had therein to the accompanying drawings.

The invention relates to reduction gearing and has for one of its objects the provision of a housing through either end of which the drive and driven shafts may extend and in which the gearing for driving the driven shaft from the drive shaft may be inverted end for end whereby the one housing may be used regardless of the ends thereof through which the drive and driven shafts extend. Another object is the provision of a reduction gearing in which the drive and driven shafts are in alignment and journalled in bearings within the housing, the driven shaft being journalled also in the drive shaft. Further objects of the invention reside in the novel features of construction and combinations and arrangements of parts as more fully hereinafter set forth.

Figure 1:
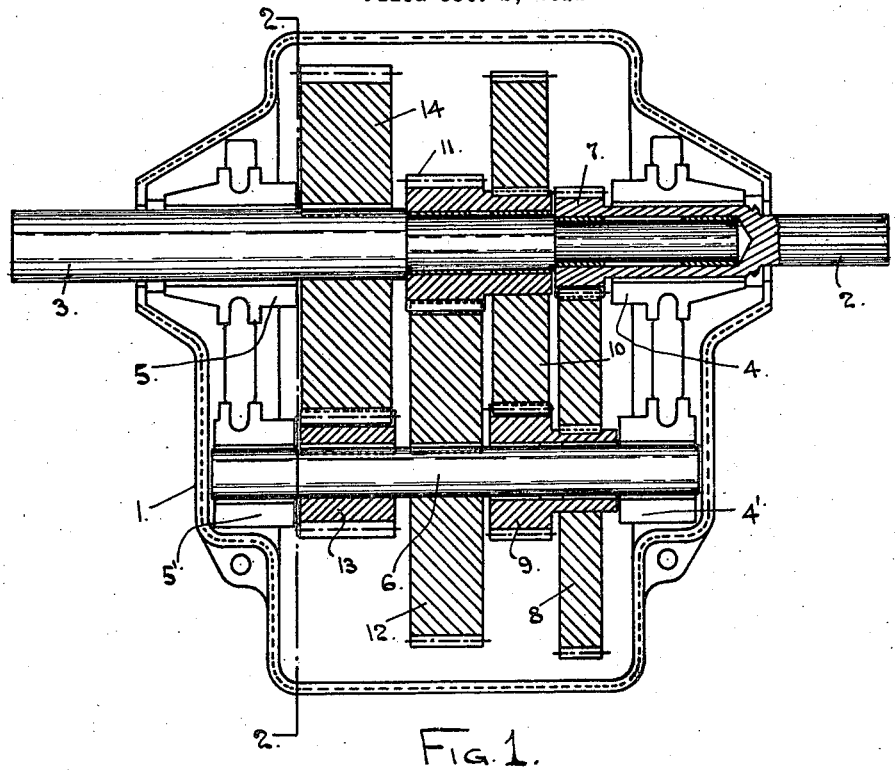
Figure 1 is a sectional plan view of a reduction gearing embodying my invention.
Figure 2:
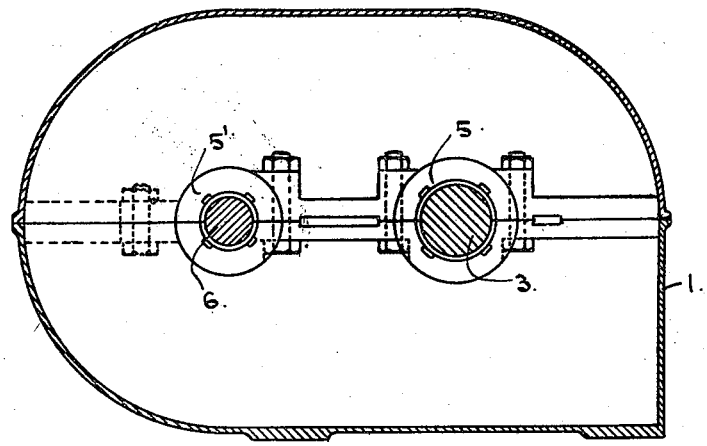
Figure 2 is a cross section on the line 2—2 of Figure 1.

1 is the housing of the reduction gearing, and 2 and 3 are respectively the drive and driven shafts extending through the opposite ends of the housing and operatively connected by reducing gears within the housing.

For the purpose of providing a reduction gearing in which the one housing may be used and the drive and driven shafts may alternatively extend through either end, the housing 1 is symmetrical about its transverse center line and the bearings 4 and 5 at the ends of the housing are equally spaced from this center line. The drive shaft 2 is journalled in the bearing 4 while the driven shaft 3 is journalled in the bearing 5, the diameters of the journalled portions of the shafts being the same. The driven shaft 3 has a reduced inner end which is journalled within the hollow journalled portion of the drive shaft 2, the arrangement being such that the driven shaft is journalled at longitudinally spaced points within the housing and in addition assists in maintaining the axial alignment of the drive shaft.

The reducing gears are mounted upon the drive and driven shafts and the counter shaft 6 which is journalled in bearings 4' and 5' upon the supports for the bearings 4 and 5. These reducing gears comprise the pinion 7 upon the inner end of the drive shaft 2 and at the inner side of the bearing 4, this pinion being preferably integral with the drive shaft, the gear 8 journalled upon the counter shaft 6 and meshing with the pinion 7, the pinion 9 journalled upon the counter shaft 6 and driven from the gear 8, the gear 10 journalled upon the driven shaft 3 and meshing with the pinion 9, the pinion 11 also journalled upon the driven shaft and driven from the gear 10, this latter pinion meshing with the gear 12 keyed upon the counter shaft 6, the pinion 13 keyed upon the counter shaft, and the gear 14 keyed upon the driven shaft and meshing with the pinion 13.

The housing has a removable cover and the bearings have removable caps so that upon removing the cover and caps, the drive and driven shafts and also the counter shaft with the gears thereon may be removed and bodily inverted end for end.

What I claim as my invention is:

1. In gearing, the combination with a housing, of bearings adjacent to the ends of said housing, a drive shaft extending through one end of said housing and having a portion journaled in the adjacent bearing, a driven shaft extending through the other end of said housing and having a portion journaled in a bearing adjacent said last mentioned end, a counter shaft located entirely within said housing and journaled in a pair of said bearings, intermeshing gears upon said shafts for driving said driven shaft from said drive shaft, and detachable caps forming parts of said last mentioned bearings in which said counter shaft is journaled, said shafts with said gears being invertible end for end.

2. In gearing, the combination with a housing symmetrical about the transverse center line, of bearings adjacent to the ends of said housing and spaced equal distances from the center line, a drive shaft extending through one end of said housing and having a portion journaled in an adjacent bearing, a driven shaft extending through the other end of said housing and having a portion journaled in a bearing adjacent to said last mentioned end, said driven shaft being also journaled within said drive shaft, a counter shaft located entirely within the said housing and journaled in a pair of said bearings, intermeshing gears upon said shafts for driving said driven shaft from said drive shaft, and detachable caps forming parts of said last mentioned bearings in which said counter shaft is journaled, said shafts with said gears being invertible end for end.

In testimony whereof I affix my signature.

WILLIAM E. BEE.